United States Patent
Kashtan et al.

(10) Patent No.: US 11,748,141 B2
(45) Date of Patent: Sep. 5, 2023

(54) PROVIDING VIRTUAL DEVICES DIRECT ACCESS TO CLOCK TIMES IN MEMORY LOCATIONS MANAGED BY A HYPERVISOR

(71) Applicant: Red Hat, Inc., Raleigh, NC (US)

(72) Inventors: Yuval Kashtan, Tel Aviv (IL); Gal Hammer, Kfar Saba (IL)

(73) Assignee: Red Hat, Inc., Raleigh, NC (US)

( * ) Notice: Subject to any disclaimer, the term of this patent is extended or adjusted under 35 U.S.C. 154(b) by 180 days.

(21) Appl. No.: 17/085,945

(22) Filed: Oct. 30, 2020

(65) Prior Publication Data

US 2022/0137995 A1 May 5, 2022

(51) Int. Cl.
G06F 9/455 (2018.01)
G06F 9/30 (2018.01)
G06F 1/14 (2006.01)
H04J 3/06 (2006.01)

(52) U.S. Cl.
CPC .......... *G06F 9/45558* (2013.01); *G06F 1/14* (2013.01); *G06F 9/30087* (2013.01); *H04J 3/0667* (2013.01); G06F 2009/45562 (2013.01); G06F 2009/45583 (2013.01); G06F 2009/45591 (2013.01); G06F 2009/45595 (2013.01)

(58) Field of Classification Search
CPC .... G06F 9/45558; G06F 1/14; G06F 9/30087; G06F 2009/45562; G06F 2009/45591; G06F 2009/45595; G06F 2009/45583; H04J 3/0667
See application file for complete search history.

(56) References Cited

U.S. PATENT DOCUMENTS

| | | | |
|---|---|---|---|
| 5,636,373 A * | 6/1997 | Glendening | G06F 1/04 713/400 |
| 6,870,876 B1 * | 3/2005 | Nohlgren | H04J 3/0632 375/220 |
| 8,694,819 B2 | 4/2014 | De Dinechin et al. | |
| 9,344,265 B2 | 5/2016 | Karnes | |
| 9,389,885 B2 | 7/2016 | Niesser et al. | |
| 9,459,652 B1 * | 10/2016 | Landers | G06F 1/12 |

(Continued)

FOREIGN PATENT DOCUMENTS

CN 108829493 A 11/2018

OTHER PUBLICATIONS

"Virtual device", http://computerhope.com/jargon/v/virtdevi.htm, accessible on Feb. 17, 2017 (Year: 2017).*

(Continued)

*Primary Examiner* — Michael W Ayers
(74) *Attorney, Agent, or Firm* — Womble Bond Dickinson (US) LLP

(57) ABSTRACT

Providing clock times to virtual devices. In one embodiment, a method includes identifying a real-time clock device of a host computing device. The host computing device comprises a hypervisor and a virtual machine. The method also includes determining that a virtual device used by the virtual machine will use clock times obtained from the real-time clock device. The method further includes obtaining, by a processing device of the host computing device, a current clock time from the real-time clock device of the host computing device. The method further includes providing the current clock time to the virtual device.

20 Claims, 5 Drawing Sheets

(56) References Cited

U.S. PATENT DOCUMENTS

| | | | |
|---|---|---|---|
| 2008/0104439 A1* | 5/2008 | Yu | G06F 1/14 713/500 |
| 2010/0318762 A1* | 12/2010 | Malyugin | G06F 12/109 711/E12.001 |
| 2011/0252266 A1* | 10/2011 | Costa | G06F 9/45533 713/500 |
| 2016/0006804 A1* | 1/2016 | Deshpande | H04L 41/0213 709/248 |
| 2017/0315834 A1* | 11/2017 | Mikhaylov | G06F 9/52 |
| 2020/0125397 A1* | 4/2020 | Wu | G06F 9/45558 |
| 2021/0011780 A1* | 1/2021 | Wan | G06F 9/5083 |
| 2021/0303021 A1* | 9/2021 | Cui | G06F 1/12 |

OTHER PUBLICATIONS

Timekeeping in VMware Virtual Machines; Vitaly Kuznetsov; VMware Inc. https://www.vmware.com/content/dam/digitalmarketing/vmware/en/pdf/techpaper/Timekeeping-In-VirtualMachines.pdf.

An introduction to Timekeeping in Linux VMs; Red Hat, Inc.; pub date: Jun. 8, 2017 https://opensource.com/article/17/6/timekeeping-linux-vms.

* cited by examiner

PROVIDING VIRTUAL DEVICES DIRECT ACCESS TO CLOCK TIMES IN MEMORY LOCATIONS MANAGED BY A HYPERVISOR

TECHNICAL FIELD

Aspects of the present disclosure relate to virtual machines (VMs), and more particularly, to providing clock times to virtual devices.

BACKGROUND

A virtual machine (VM) is a portion of software that, when executed on appropriate hardware, creates an environment allowing the virtualization of an actual physical computer system (e.g., a server, a mainframe computer, etc.). The actual physical computer system is typically referred to as a "host machine," and the operating system (OS) of the host machine is typically referred to as the "host operating system." Typically, software on the host machine known as a "hypervisor" (or a "virtual machine monitor") manages the execution of one or more virtual machines or "guests", providing a variety of functions such as virtualizing and allocating resources, context switching among virtual machines, etc. The operating system (OS) of the virtual machine is typically referred to as the "guest operating system."

A hypervisor may abstract the physical resources of a computing device such as physical processing devices (e.g., processors, CPUs, etc.) and physical memory (e.g., RAM) into virtual devices (e.g., virtual resources) which can be utilized to deploy multiple VMs. The hypervisor may manage and assign these virtual devices to each VM running on the computing device.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

As discussed above, a virtual machine may be a portion of software that, when executed on appropriate hardware, creates an environment allowing the virtualization of an actual physical computer system (e.g., a server, a mainframe computer, etc.). Typically, software on the host machine known as a hypervisor (or a virtual machine monitor" manages the execution of one or more virtual machines (e.g., guests), providing a variety of functions such as virtualizing and allocating resources, context switching among virtual machines, etc. A hypervisor may abstract the physical resources of a computing device such as physical processing devices (e.g., processors, CPUs, etc.), physical memory (e.g., RAM), video cards, sound cards, network interface card, etc., into virtual devices (e.g., virtual resources) which can be utilized to deploy multiple VMs. The hypervisor may manage and assign these virtual devices to each VM running on the computing device.

A virtual device, such as a virtual network interface card, used by a virtual machine may use clock times generated by a real-time clock (RTC) device when performing various operations, functions, actions, etc. However, because the virtual machine may be aa software emulation of a physical computing device, the virtual machine does not have an RTC device that can be used to generate and provide clock times to the virtual device. The hypervisor may emulate an RTC device, however, this may increase the amount of computing resources used by the hypervisor. In addition, emulating an RTC device may decrease the precision of clock times generated by the emulated RTC device. For example, the times generated by the RTC device may lag behind the real time generated by the physical RTC device. Thus, emulating an RTC device may not be feasible for virtual devices that use accurate clock times when performing operations, actions, functions, etc.

The embodiments, examples, implementations, etc., disclosed herein allow accurate clock times to be provided to virtual devices with lower overhead (e.g., with fewer processing resources) and with higher precision and/or accuracy than an emulated RTC device. A clock component of a hypervisor may continually obtain the current clock time from an RTC device. The current clock time may continually be written to a memory location that is accessible by one or more virtual devices. The virtual devices may access (e.g., read the memory location) to obtain the current clock time. The clock component may enable the virtual device to obtain accurate/precise clock times while using fewer processing resources of the computing device.

Figure 1:
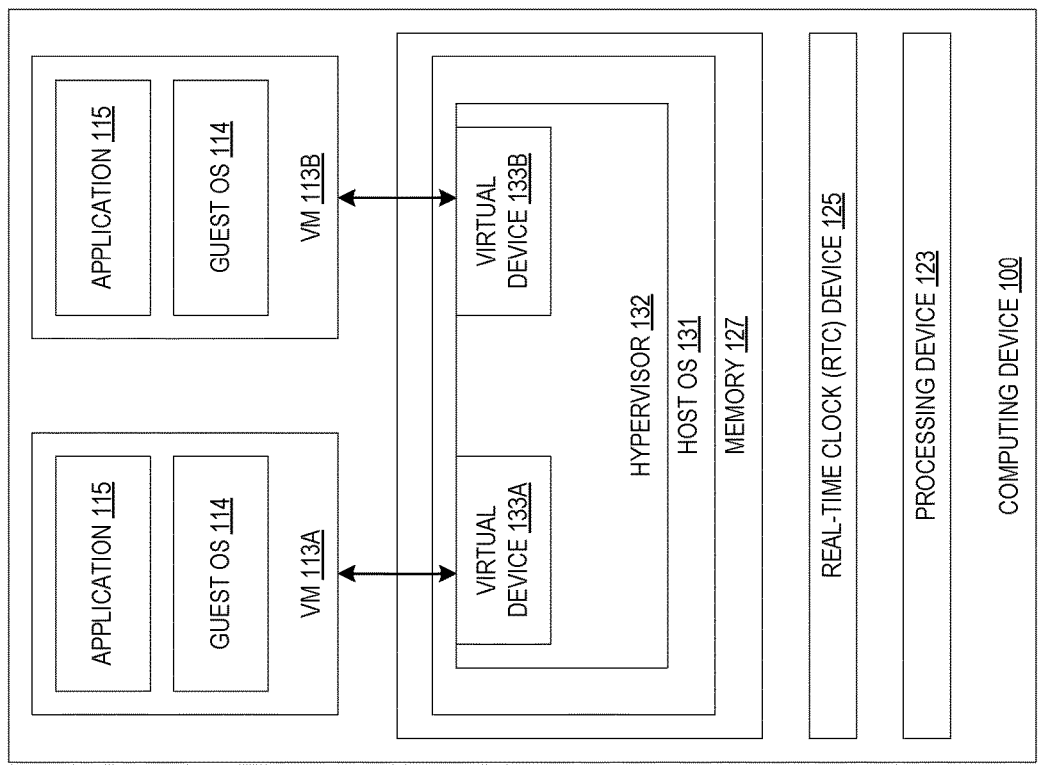
FIG. 1 is a block diagram that illustrates an example computing device, in accordance with some embodiments of the present disclosure.

FIG. 1 is a block diagram that illustrates an example computing device 100, in accordance with some embodiments of the present disclosure. Computing device 100 may include hardware such as processing device 123 (e.g., processors, central processing units (CPUs)), memory 127 (e.g., random access memory (RAM), storage devices (e.g., hard-disk drive (HDD), solid-state drive (SSD), etc.), and other hardware devices (e.g., sound card, video card, etc.). In some embodiments, memory 127 may be a persistent storage that is capable of storing data. A persistent storage may be a local storage unit or a remote storage unit. Persistent storage may be a magnetic storage unit, optical storage unit, solid state storage unit, electronic storage units (main memory), or similar storage unit. Persistent storage may also be a monolithic/single device or a distributed set of devices. Memory 127 may be configured for long-term storage of data and may retain data between power on/off cycles of the computing device 100. The computing device 100 may comprise any suitable type of computing device or machine that has a programmable processor including, for example, server computers, desktop computers, laptop computers, tablet computers, smartphones, set-top boxes, etc. In some examples, the computing device 100 may comprise a single machine or may include multiple interconnected machines (e.g., multiple servers configured in a cluster). Memory 127 may include host operating system (OS) 131, which may manage the execution of other components (e.g., software, applications, etc.) and/or may manage access to the hardware (e.g., processors, memory, storage devices etc.) of the computing device 100. The computing device 100 may also be referred to as a host computing device, a host system, a host computer, a host, a virtual machine host, etc.

The host OS 131 may include a hypervisor 132, which may also be known as a virtual machine monitor (VMM). In the example shown, hypervisor 132 may be a component of the host operating system 131. In another example, hypervisor 132 may run on top of host operating system 131, or may run directly on host hardware without the use of a host operating system 131. Hypervisor 132 may manage system resources, including access to processing device 123, memory 127, other storage devices (e.g., HDDs, SSDs), and/or other devices (e.g., sound cards, video cards, etc.). The hypervisor 132, though typically implemented in software, may emulate and export a bare machine interface to higher level software in the form of virtual processors and guest memory (virtual resources). Higher level software may comprise a standard or real-time operating system (OS), may be a highly stripped down operating environment with limited operating system functionality, and/or may not include traditional OS facilities, etc. For example, higher level software may be a network virtualization platform (not shown) such as the RedHat™ OpenStack™ virtualization platform. Hypervisor 132 may present other software (e.g., "guest" software) the abstraction of one or more virtual machines (VMs) that provide the same or different abstractions to various guest software (e.g., guest operating system, guest applications).

In some embodiments, a network virtualization platform (also referred to as a "virtualization management service") may also execute on the host OS 131. The network virtualization platform may use a consistent set of application programming interfaces (APIs) to abstract those virtual resources provided by the hypervisor 132 one step further into discrete pools that may be used to configure and deploy VMs (e.g., VMs 113A and 113B) and applications 115 that administrators and users may interact with directly. The applications 115 may be referred to as guest software. The network virtualization platform may include a deployment controller to handle creation of VMs 113 as well as provisioning of the VMs 113 with virtual applications 115. The deployment controller may also function to manage the operations of the virtual applications. For example, the network virtualization platform may utilize the deployment controller to create virtual switches (and a VM 113 for the switch to run on) as well as manage the operations of the virtual switch (e.g., configuring/modifying rules and groups, managing connections with other virtual network functions (VNFs) and handling diagnostic tasks). The VMs 113 may be isolated, in that they are not connected to any other device or component of computing device 100, whether virtual or otherwise.

VMs 113A-113B may execute on computing device 100 as described herein. In one embodiment, a VM 113 may be a software implementation of a machine (e.g., a software implementation of a computing device) that includes its own operating system (e.g., guest OS 114) and executes one or more applications 115. Application 115 may be an application program, application, app, or software such as a virtual network function. The hypervisor 132 may emulate the hardware (and other physical resources) to provide virtual resources which may be used by the VMs 113 to execute guest software/applications (e.g., applications 115), as discussed in more detail herein. A VM 113 may be, for example, a hardware emulation, a full virtualization, a para-virtualization, and an operating system-level virtualization VM.

A VM 113 may execute an application 115 (e.g., guest software) which may use an underlying emulation of the physical resources (e.g., virtual processors and guest memory—virtual resources). Both the VM 113 and the application 115 may be configured and deployed by a network virtualization platform executing atop the host OS 131, as discussed above. The network virtualization platform, via the computing device 100, may provide administrators and users with the capability to virtualize a variety of functions (e.g., network functions). Although one application 115 is illustrated in a respective VM 113, a VM 113 may include multiple applications 115 in other embodiments. In some embodiments, applications 115 may be deployed and managed by a deployment controller (not illustrated in the figures) executing as part of a network virtualization platform.

As illustrated in FIG. 1, the computing device 100 also includes a real-time clock (RTC) device 125. In one embodiment, the RTC device 125 may be a device, such as a hardware device, a circuit, a component, etc., that measures the passage of time. For example, the RTC device 125 may include an integrated circuit, a crystal oscillator, etc. The term RTC or RTC device is a term of art in the field of computer/electronic devices that refers to a device that measure the passage of time. The RTC device 125 may continuously generate clock times. For example, the RTC device 125 may generate clock times tens, hundreds, thousands, millions, etc., of times per second. Each clock time may indicate the current time when the clock time was generated by the RTC device 125. The RTC device 125 may generate clock times in various formats. For example, the RTC device 125 may generate clock times in UNIX time format (e.g., epoch time, POSIX time, etc.), a network time protocol (NTP) format, a precision time protocol (PTP) format, an International Atomic Time (TAI) format, a Coordinated Universal Time (UTC) format, etc.

The hypervisor 132 includes virtual devices 133A and 133B. In one embodiment, the virtual devices 133A and 133B may be managed and/or created by the hypervisor 132. An emulated device may be a software emulation of a physical device. For example, a virtual device may be a virtual graphics card (e.g., a virtual GPU), a virtual disk drive, a virtual network interface card (NIC), etc. The guest OSs 114 and applications 115 of the VMs 113A and 113B may use, access, and/or interact with the virtual devices 133A and 133B as if they were physical (e.g., real or actual) devices. For example, virtual device 133A may be a virtual network interface card. An application 115 may communicate (e.g., transmit and/or receive) data (e.g., internet protocol (IP) packets, frames, messages, etc.) with other devices via the virtual device 133A. The virtual devices 133A and 133B may be mapped to, may correspond to, and/or may be associated with physical devices of the computing device 100. For example, if the virtual device 133A is a virtual network interface card, the virtual device 133A may be mapped to a physical network interface card. The hypervisor 132 may present the virtual devices 133A and 133B to the virtual machines 113A and 113B so that the virtual machines 113A and 113B may use the virtual device as if they were physical device. The hypervisor 132 may use the physical devices to perform the operations, actions, functions, etc., requested by the VMs 113A and 113B, and/or the applications 115. For example, an application 115 may transmit data using virtual device 113A (e.g., a virtual network interface card). The functions, operations, actions, etc., performed by the virtual device 133A may be performed by the physical network interface card. For example, the physical network interface card would be used to transmit the data.

In one embodiment, one or more of the applications 115 and the virtual devices 133A and 133B may use clock times generated by the RTC device 125. For example, an application 115 and/or a virtual network interface card may use the precision time protocol (PTP). PTP may be a protocol that is used to synchronize clock devices throughout a network (e.g., clock devices on other computing devices in the network). The PTP protocol may allow the RTC device 125 to achieve clock accuracy within a certain range/threshold. For example, the PTP protocol may allow the RTC device 125 to achieve clock accuracy in the sub-microsecond range. The virtual devices 133A may want to use the RTC device 125 to generate timestamps for messages/packets that are communicated to other computing devices as part of the PTP protocol. For example, the timestamps of the messages/packets transmitted by the VM 113A and/or the application 115 (on the VM 113A) may be used to synchronize the clock devices of other computing devices on the network.

As discussed above, emulating an RTC device 125 may increase the amount of computing resources used by the hypervisor 132. In addition, emulating an RTC device 125 may decrease the precision of clock times generated by the emulated RTC device due to a lag/difference between the times generated by the emulated RTC device and the RTC device 125. Because of the decrease in precision/accuracy, emulating an RTC device may not be feasible for virtual devices that use accurate clock times when performing operations, actions, functions, etc., such as using PTP to synchronize other computing devices on a network. Thus, it may be useful to provide clock times generated by a RTC device to a virtual device while maintaining the accuracy/precision of the clock time and without increase the amount of computing resources used by the hypervisor 132.

Figure 2:
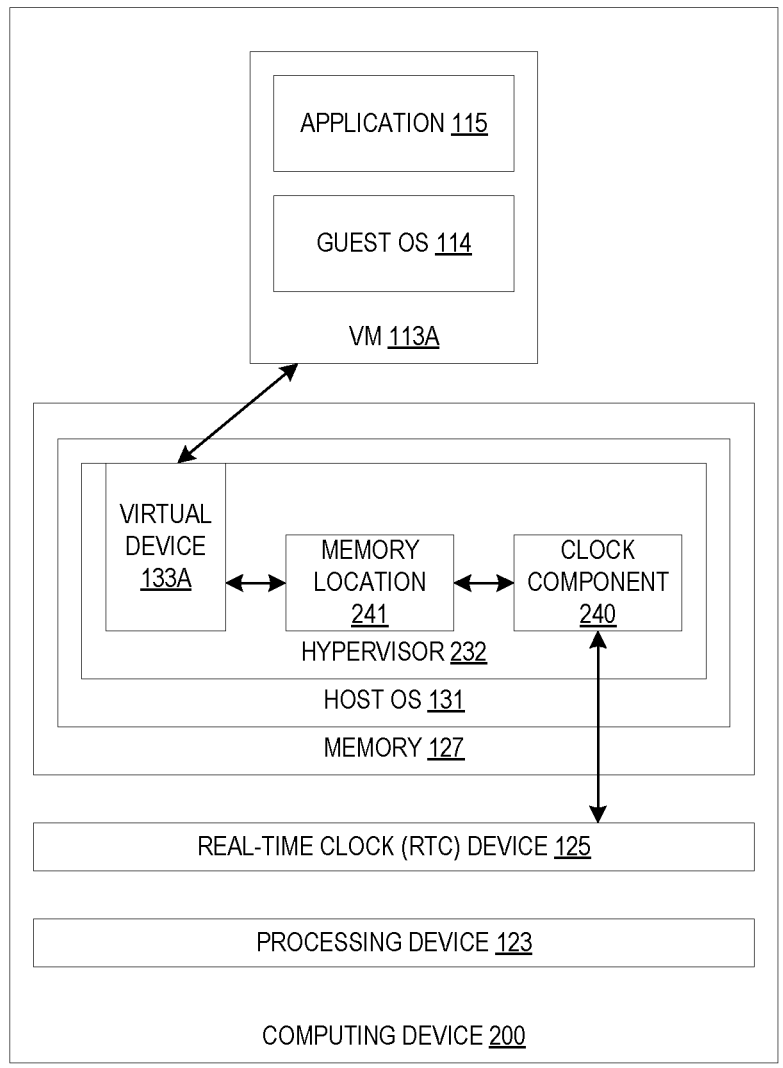
FIG. 2 is a block diagram that illustrates an example computing device, in accordance with some embodiments of the present disclosure.

FIG. 2 is a block diagram that illustrates an example computing device 200, in accordance with some embodiments of the present disclosure. Computing device 200 may include hardware such as processing device 123, memory 127, storage devices, and other hardware devices (e.g., a network interface card, etc.). In some examples, the computing device 200 may comprise a single machine or may include multiple interconnected machines. Memory 127 may include host operating system (OS) 131, which may manage the execution of other components (e.g., software, applications, etc.) and/or may manage access to the hardware (e.g., processors, memory, storage devices etc.) of the computing device 200. The computing device 200 may also be referred to as a host computing device, a host system, a host computer, a host, a virtual machine host, etc.

The host OS 131 may include a hypervisor 232, which may also be known as a virtual machine monitor (VMM). The hypervisor 232 may be a component of the host operating system 131 or may run on top of host operating system 131, or may run directly on host hardware without the use of a host operating system 131. Hypervisor 232 may manage system resources, including access to processing device 123, memory 127, storage devices, and/or other devices. Hypervisor 232 may present other software (e.g., "guest" software) the abstraction of one or more virtual machines (VMs) that provide the same or different abstractions to various guest software.

VMs 113A-113B may execute on computing device 200 as described herein. In one embodiment, a VM 113 may be a software implementation of a machine that includes its own operating system (e.g., guest OS 114) and executes one or more applications 115. A VM 113 may execute an application 115 which may use which may use an underlying emulation of the physical resources (e.g., virtual processors and guest memory—virtual resources). Application 115 may be an application program, application, or software such as a virtual network function. The hypervisor 232 may emulate the hardware (and other physical resources) to provide virtual resources which may be used by the VMs 113 to execute guest software/applications.

As illustrated in FIG. 2, the computing device 200 also includes a real-time clock (RTC) device 125. The RTC device 125 may be a device, such as a hardware device, a circuit, a component, etc., that measures the passage of time. The RTC device 125 may continuously generate clock times (e.g., may generate clock times tens, hundreds, thousands, millions, etc., of times per second). The RTC device 125 may generate clock times in various formats, as discussed above.

The hypervisor 232 includes virtual devices 133A and 133B. The virtual devices 133A and 133B may be managed and/or created by the hypervisor 232. An emulated device may be a software emulation of a physical device. The guest OSs 114 and applications 115 of the VMs 113A and 113B may use, access, and/or interact with the virtual devices 133A and 133B as if they were physical (e.g., real or actual) devices. The virtual devices 133A and 133B may be mapped to, may correspond to, and/or may be associated with physical devices of the computing device 200. The hypervisor 232 may use the physical devices to perform the operations, actions, functions, etc., requested by the VMs 113A and 113B, and/or the applications 115.

In one embodiment, one or more of the applications 115 and the virtual devices 133A and 133B may use clock times generated by the RTC device 125. For example, an application 115 and/or a virtual network interface card may use the precision time protocol (PTP). PTP may be a protocol that is used to synchronize clock devices throughout a network (e.g., clock devices on other computing device in the network).

In one embodiment, the clock component 240 may identify a RTC device of the computing device 200. For example, the computing device 200 may include multiple clock devices (e.g., multiple RTCs). The clock component 240 may identify RTC device 125 as the RTC device that should be used. The clock component 240 may identify RTC device 125 based on configuration data (e.g., configuration parameters/settings in the host OS 131), user input, a configuration file, basis input/output system (BIOS) settings, etc.

In one embodiment, the clock component 240 may synchronize the RTC device 125 with a reference time obtained from one or more of an external device and an external service. For example, the clock component 240 may communicate with a server computer to synchronize the RTC device 125 with International Atomic Time, Coordinated Universal Time (UTC), Greenwich Mean Time (GMT), etc.

In one embodiment, the clock component 240 may determine that the virtual device 133A used by the virtual machine 113A will use clock times. For example, the clock component 240 may determine that the virtual device 133A is a virtual network interface card that implements and/or uses PTP. In another example, the clock component 240 may determine that the virtual device is a type of virtual device that will generate timestamps and/or uses the current time to perform various functions, operations, actions, etc. In a further example, the clock component 240 may determine that the virtual device 133A uses clock times based on settings/parameters of the hypervisor 232 and/or user input.

In one embodiment, the clock component 240 may obtain a current clock time from the RTC device 125. For example, the clock component 240 may query, poll, etc., the RTC device 125 to request the current time. The clock component 240 may access the RTC device 125 through various types of interfaces (e.g., hardware interfaces such as pins, wires, traces, circuits, etc.) and/or application programming interfaces (APIs).

In one embodiment, the clock component 240 may provide the current clock time to the virtual device 133A. This may allow the virtual device 133A to use the current clock time to generate time stamps and/or perform other functions, operations, actions, etc., that may use the current clock time.

In one embodiment, the clock component 240 may provide the current clock time to the virtual device 133A by allowing the virtual device 133A to access the memory location 241. The memory location 241 may a page, block, etc., in a memory that may be controlled, managed, and/or accessible to the hypervisor 232. For example, the memory location 241 may be a page in the memory 127 that the hypervisor 232 has access to and/or is allowed to manage. The clock component 240 may write the current time (obtained from the RTC device 125) to the memory location 241. The virtual device 133A may obtain the current time from the memory location 241 by reading current time for the memory location 241, when the VM 113A or components of the VM 113A (e.g., application 115 and/or guest OS 114) perform operations, actions, functions, etc., that use the current time.

In one embodiment, the clock component 240 may continuously and/or periodically obtain updated clock times (e.g., updated current clock times) from the RTC device 125. For example, the clock component 240 may obtain an updated clock time one every microsecond, half a microsecond, or some other appropriate time period (e.g., time interval). The time period (at which the clock component 240 may continuously and/or periodically obtain updated clock times from the RTC device 125) may be less than and/or equal to a threshold time period. For example, threshold time period may be one microsecond. The clock component 240 may obtain a new time every half a microsecond, quarter of a microsecond, or some other time period that is less than or equal to one microsecond.

In one embodiment, the clock component 240 may write the updated clock time to the memory location 241 each time period. As discussed above, the clock component 240 may continuously and/or periodically obtain updated clock times from the RTC device 125 each time period (e.g., every microsecond, every half of a microsecond, etc.). The clock component 240 may write each updated clock time (that is obtained every time period) to the memory location 241. The continual and/or periodic updating of the clock time in the memory location 241 may help ensure that whenever the virtual device 133A accesses (e.g., reads) the memory location 241, the virtual device 133A is able to obtain the most current clock time that has been obtained by the clock component 240.

As illustrated in FIG. 1, a computing device may include (e.g., may host) multiple virtual machines 113A and 113B. Each of the virtual machines 113A and 113B may use different virtual devices 133A and 133B. For example, the hypervisor 132 may emulate multiple virtual devices 133A and 133B that may be used by different virtual machines 113A and 113B. Referring back to FIG. 2, the hypervisor 232 may also emulate multiple virtual devices (not illustrated in FIG. 2) that may be used by multiple virtual machines (also not illustrated in FIG. 2). In one embodiment, multiple virtual devices may use clock times generated by the RTC device 125. If multiple virtual devices use the clock times, the clock component 240 may grant each of the multiple virtual devices access to the memory location 241 (e.g., each virtual device is granted access to the same memory location). This allows each virtual device to obtain the latest clock time from the memory location 241. In other embodiments, the clock component 240 may write the current clock time (e.g., the same, current clock time) to different memory locations for different virtual devices. For example, the same, current clock time may be written to three different memory locations, each of which may be accessible by different virtual devices (to obtain the current clock time).

As discussed above, emulating an RTC device 125 may increase the amount of computing resources used by the hypervisor 132 and may decrease the precision of clock times generated by the emulated RTC device. Thus, emulating an RTC device may not be feasible for virtual devices that use accurate clock times when performing operations, actions, functions, etc., such as using PTP to synchronize other computing devices on a network. The clock component 240 may allow accurate/precise clock times to be provided to the virtual device 133A without using a virtual RTC device. In addition, because the hypervisor 232 does not use an emulated RTC device, the hypervisor 232 may use fewer computing resources.

Figure 3:
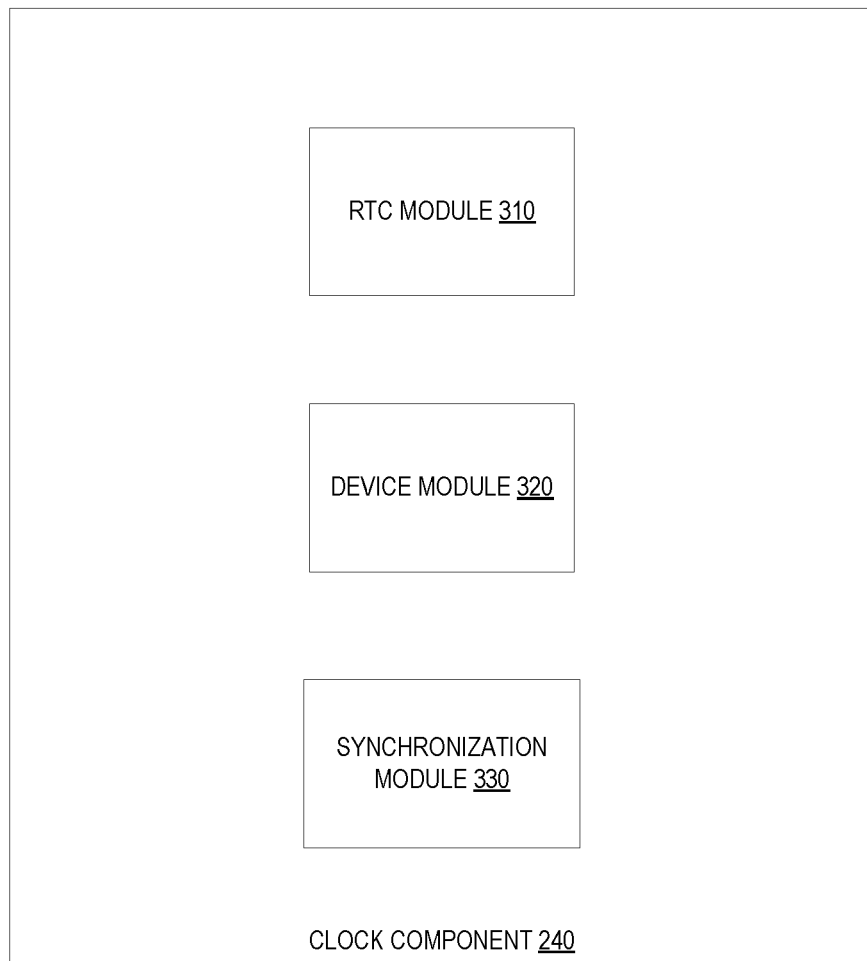
FIG. 3 is a block diagram that illustrates an example clock component, in accordance with some embodiments of the present disclosure.

FIG. 3 is a block diagram that illustrates an example clock component 240, in accordance with some embodiments of the present disclosure. As discussed above, the clock component 240 may be part of a computing device 200 (e.g., a host computing device). The clock component 240 includes, but is not limited to, an RTC module 310, a device module 320, and a synchronization module 330. Some or all of modules 310-330 may be implemented in software, hardware, or a combination thereof. For example, one or more of modules 310-330 may be installed in persistent storage device, loaded into memory, and executed by one or more processors (not shown). In another example, one or more of modules 310-330 may be processing devices, such as an application specific integrated circuit (ASIC), a field programmable gate array (FPGA), etc. Some of modules 310-330 may be integrated together as an integrated component. In addition, some of modules 310-330 may be located in different computing devices (e.g., different server computers).

In one embodiment, the RTC module 310 may identify a RTC device of a computing device (e.g., a host computing device). For example, the RTC module 310 may select one of multiple RTC devices to use. The RTC module 310 may identify an RTC device based on configuration data, user input, a configuration file, basis input/output system (BIOS) settings, etc. In one embodiment, the synchronization module 330 may synchronize the RTC device (identified by the RTC module 310) with a reference time obtained from one or more of an external device and an external service.

In one embodiment, device module 320 may determine that a virtual device (e.g., a virtual network interface card) used by the virtual machine will use clock times. The device module 320 may obtain a current clock time from the RTC device. The device module 320 may provide the current clock time to the virtual device, which may allow the virtual device to use the current clock time to generate time stamps and/or perform other functions, operations, actions, etc., that may use the current clock time.

In one embodiment, the device module 320 may provide the current clock time to the virtual device by allowing the virtual device to access the memory location (e.g., a page, a block, a storage device, etc.) managed, controlled, and/or accessible to the device module 320. The device module 320 may write the current time (obtained from the RTC device) to the memory location. The virtual device may obtain the current time from the memory location by reading current time for the memory location. The device module 320 may continuously and/or periodically obtain updated clock times from the RTC device and may write the updated clock time to the memory location each time period. The continual and/or periodic updating of the clock time in the memory location may help ensure that whenever the virtual device accesses (e.g., reads) the memory location, the virtual device is able to obtain the most current clock time that has been obtained by the device module 320. In one embodiment, the memory location may be accessible to multiple virtual devices. In another embodiment, the device module 320 may write the current/updated clock times to different memory locations for different virtual devices.

Figure 4:
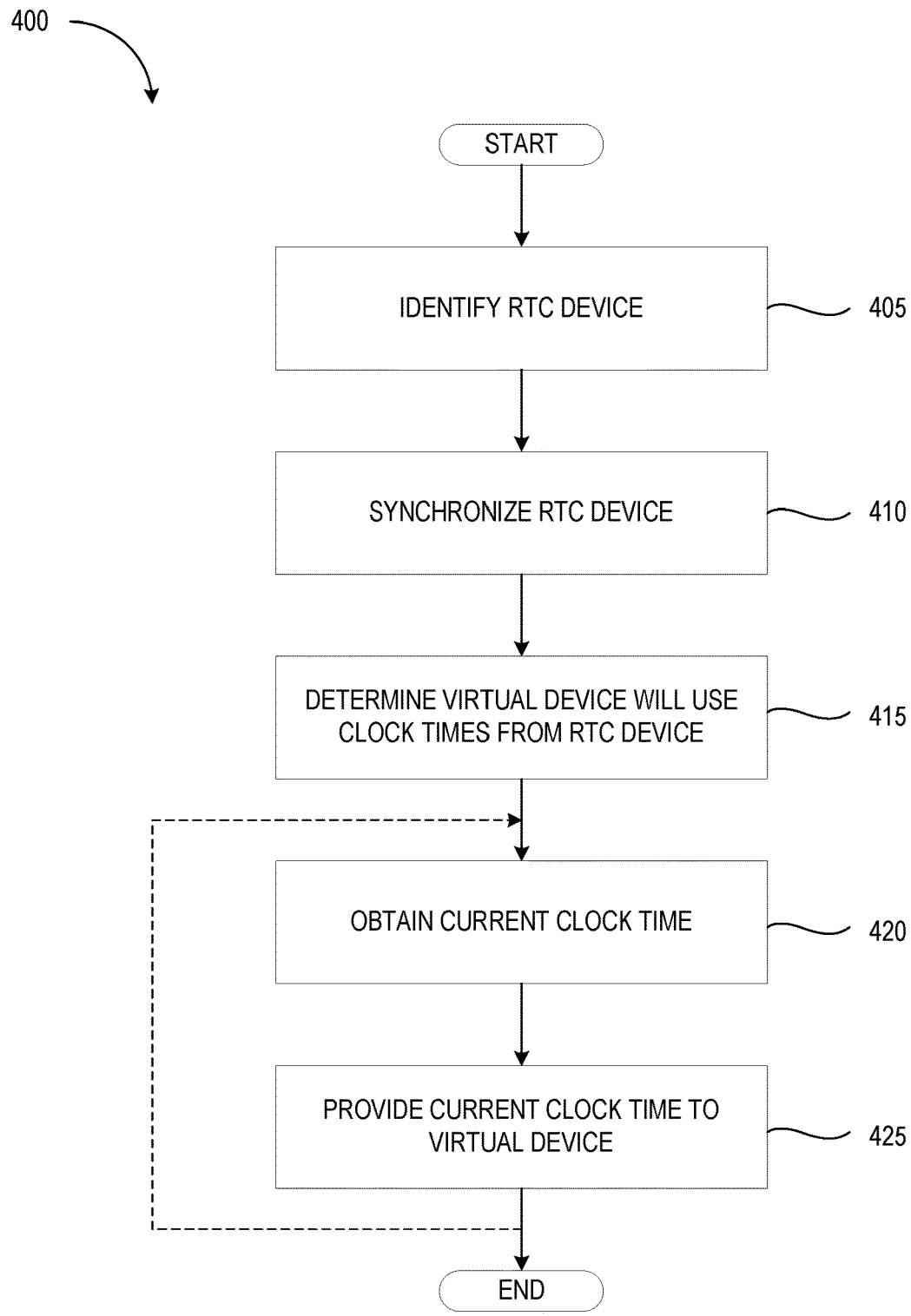
FIG. 4 is a flow diagram of a method for providing clocks times to virtual devices, in accordance with some embodiments of the present disclosure.

FIG. 4 is a flow diagram of a process 400 for providing clock times to a virtual device, in accordance with some embodiments of the present disclosure. Process 400 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, the process 400 may be performed by one or more of a computing device (e.g., computing device 200 illustrated in FIG. 2), a hypervisor (e.g., hypervisor 232 illustrated in FIG. 2), and a clock component (e.g., clock component 240 illustrated in FIG. 2).

With reference to FIG. 4, process 400 illustrates example functions used by various embodiments. Although specific function blocks ("blocks") are disclosed in process 400, such blocks are examples. That is, embodiments are well suited to performing various other blocks or variations of the blocks recited in process 400. It is appreciated that the blocks in process 400 may be performed in an order different than presented, and that not all of the blocks in process 400 may be performed. In addition, additional other blocks (not illustrated in FIG. 4) may be inserted between the blocks illustrated in FIG. 4.

Process 400 begins at block 405 where the process 400 may identify a RTC device that should be used to provide clock times to virtual devices. For example, based on configuration parameters, settings, user input, etc., the process 400 may identify the RTC device from a plurality of RTC devices. At block 410, the process 400 may synchronize the RTC device to a particular time (e.g., UTC, GMT, etc.). At block 415, the process 400 may determine that a virtual device will use clock times for the RTC device. For example, the process 400 may have a list or virtual devices that may use the RTC device and may track when one of the virtual devices from the list is created for a virtual machine. In another example, the process 400 may receive user input identifying a virtual device.

At block 420, the process may obtain the current clock time from the RTC device. For example, the process 400 may query the RTC clock device. At block 425, the process 400 may provide the current clock time to the virtual device. For example, the process 400 may write the current clock time to a memory location that is accessible to the virtual device. In some embodiments, the process 400 may continually/periodically repeat blocks 420 and 425, every time period (e.g., every microsecond, every half a microsecond, etc.), as indicated by the dashed arrow.

Figure 5:
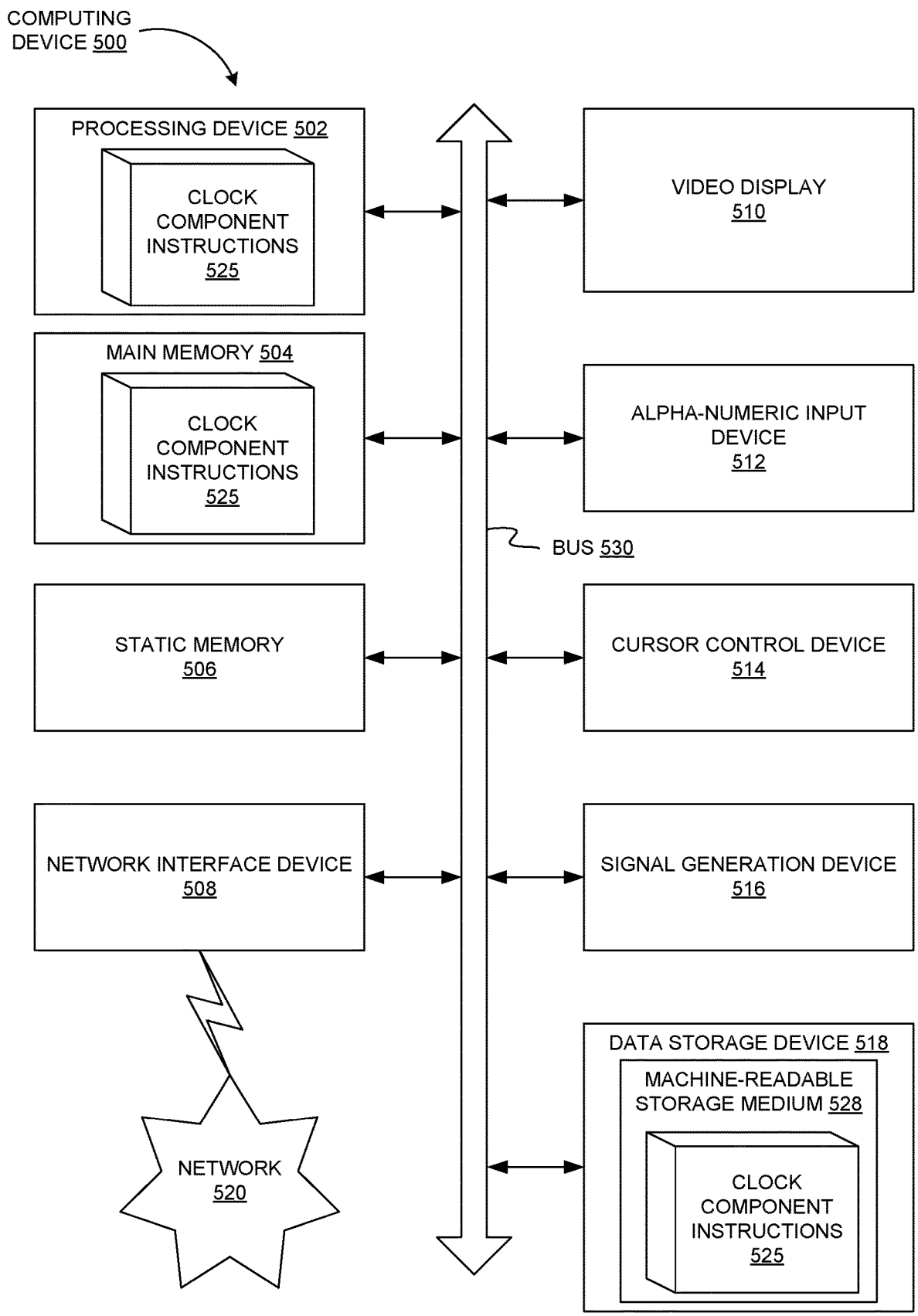
FIG. 5 is a block diagram of an example computing device that may perform one or more of the operations described herein, in accordance with some embodiments of the present disclosure.

FIG. 5 is a block diagram of an example computing device 500 that may perform one or more of the operations described herein, in accordance with some embodiments. Computing device 500 may be connected to other computing devices in a LAN, an intranet, an extranet, and/or the Internet. The computing device may operate in the capacity of a server machine in client-server network environment or in the capacity of a client in a peer-to-peer network environment. The computing device may be provided by a personal computer (PC), a set-top box (STB), a server, a network router, switch or bridge, or any machine capable of executing a set of instructions (sequential or otherwise) that specify actions to be taken by that machine. Further, while only a single computing device is illustrated, the term "computing device" shall also be taken to include any collection of computing devices that individually or jointly execute a set (or multiple sets) of instructions to perform the methods discussed herein.

The example computing device 500 may include a processing device (e.g., a general purpose processor, a programmable logic device (PLD), etc.) 502, a main memory 504 (e.g., synchronous dynamic random access memory (DRAM), read-only memory (ROM)), a static memory 506 (e.g., flash memory), and a data storage device 518), which may communicate with each other via a bus 530.

Processing device 502 may be provided by one or more general-purpose processing devices such as a microprocessor, central processing unit, or the like. In an illustrative example, processing device 502 may comprise a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 502 may also comprise one or more special-purpose processing devices such as an application specific integrated circuit (ASIC), a field programmable gate array (FPGA), a digital signal processor (DSP), network processor, or the like. The processing device 502 may be configured to execute the operations described herein, in accordance with one or more aspects of the present disclosure, for performing the operations and steps discussed herein.

Computing device 500 may further include a network interface device 508 which may communicate with a network 520. The computing device 500 also may include a video display unit 510 (e.g., a liquid crystal display (LCD) or a cathode ray tube (CRT)), an alphanumeric input device 512 (e.g., a keyboard), a cursor control device 514 (e.g., a mouse) and an acoustic signal generation device 516 (e.g., a speaker). In one embodiment, video display unit 510, alphanumeric input device 512, and cursor control device 514 may be combined into a single component or device (e.g., an LCD touch screen).

Data storage device 518 may include a computer-readable storage medium 528 on which may be stored one or more sets of clock component instructions 525, e.g., instructions for carrying out the operations described herein, in accordance with one or more aspects of the present disclosure. Clock component instructions 525 may also reside, completely or at least partially, within main memory 504 and/or within processing device 502 during execution thereof by computing device 500, main memory 504 and processing device 502 also constituting computer-readable media. The clock component instructions 525 may further be transmitted or received over a network 520 via network interface device 508.

While computer-readable storage medium 528 is shown in an illustrative example to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform the methods described herein. The term "computer-readable storage medium" shall accordingly be taken to include, but not be limited to, solid-state memories, optical media and magnetic media.

Unless specifically stated otherwise, terms such as "identifying," "determining," "obtaining," "providing," "granting," "writing," "synchronizing," or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices. Also, the terms "first," "second," "third," "fourth," etc., as used herein are meant as labels to distinguish among different elements and may not necessarily have an ordinal meaning according to their numerical designation.

Examples described herein also relate to an apparatus for performing the operations described herein. This apparatus may be specially constructed for the required purposes, or it may comprise a general purpose computing device selectively programmed by a computer program stored in the computing device. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. 112, sixth paragraph, for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method, comprising:
identifying a clock device of a host computing device, wherein the host computing device comprises a hypervisor and a virtual machine;
determining that a virtual device included within the hypervisor and used by the virtual machine to execute an application will use clock times obtained from the clock device;
continuously obtaining, by a processing device of the host computing device, a current clock time from the clock device of the host computing device;
continuously writing the current clock time from the clock device to a memory location managed by the hypervisor;
providing the virtual device direct access to the memory location to allow the virtual device to retrieve the current clock time, wherein the virtual device retrieves the current clock time directly from the memory location; and
performing an action for the application executed by the virtual machine in view of the current clock time.

2. The method of claim 1, wherein providing the current clock time to the virtual device comprises:
granting the virtual device access to a memory location managed by the hypervisor; and
writing the current clock time to the memory location.

3. The method of claim 2, wherein the virtual device obtains the current clock time by reading the current clock time from the memory location.

4. The method of claim 2, further comprising:
obtaining an updated clock time each time period, wherein each time period is less than or equal to a threshold time period; and
writing the updated clock time to the memory location each time period.

5. The method of claim 1, wherein:
the host computing device further comprises a second virtual machine;
a second virtual device uses clock times generated by the clock device; and
the current clock time is provided to the second virtual device.

6. The method of claim 1, wherein one or more applications of the virtual machine use a precision time protocol (PTP).

7. The method of claim 1, further comprising:
synchronizing the clock device with a reference time obtained from one or more of an external device and an external service.

8. The method of claim 1, wherein the virtual device comprises a virtual network interface card and uses the current clock time retrieved from the memory location in a precision time protocol (PTP).

9. The method of claim 1, wherein the clock device comprises a hardware device of the host computing device.

10. An apparatus, comprising:
a memory; and
a processing device operatively coupled to the memory, the processing device to:
identify a clock device of a host computing device, wherein the apparatus comprises a hypervisor and a virtual machine;
determine that a virtual device included within the hypervisor and used by the virtual machine to execute an application will use clock times obtained from the clock device;
continuously obtain, by the processing device, a current clock time from the clock device of the apparatus;
continuously write the current clock time from the clock device to a memory location managed by the hypervisor;
provide the virtual device direct access to the memory location to allow the virtual device to retrieve the current clock time, wherein the virtual device retrieves the current clock time directly from the memory location;
perform an action for the application executed by the virtual machine in view of the current clock time.

11. The apparatus of claim 10, wherein to provide the current clock time to the virtual device the processing device is further to:
grant the virtual device access to a memory location managed by the hypervisor; and
write the current clock time to the memory location.

12. The apparatus of claim 11, wherein the virtual device obtains the current clock time by reading the current clock time from the memory location.

13. The apparatus of claim 11, wherein the processing device is further:
obtain an updated clock time every time period, wherein the time period is less than or equal to a threshold time period; and
write the updated clock time to the memory location every time period.

14. The apparatus of claim 10, wherein:
the apparatus further comprises a second virtual machine;
a second virtual device uses clock times generated by the clock device; and
the current clock time is provided to the second virtual device.

15. The apparatus of claim 10, wherein one or more applications of the virtual machine use a precision time protocol (PTP).

16. The apparatus of claim 10, wherein the processing device is further to:
synchronize the clock device with a reference time obtained from one or more of an external device and an external service.

17. The apparatus of claim 10, wherein the virtual device comprises a virtual network interface card and uses the current clock time retrieved from the memory location in a precision time protocol (PTP).

18. The apparatus of claim 10, wherein the clock device comprises a hardware device of the apparatus.

19. A non-transitory computer readable medium having instructions stored thereon that, when executed by a processing device, cause the processing device to:
identify a clock device of a host computing device, wherein the host computing device comprises a hypervisor and a virtual machine;
determine that a virtual device included within the hypervisor and used by the virtual machine to execute an application will use clock times obtained from the clock device;
continuously obtain, by the processing device, a current clock time from the clock device of the host computing device;
continuously write the current clock time from the clock device to a memory location managed by the hypervisor;
provide the virtual device direct access to the memory location to allow the virtual device to retrieve the current clock time, wherein the virtual device retrieves the current clock time directly from the memory location;

perform an action for the application executed by the virtual machine in view of the current clock time.

20. The non-transitory computer readable medium of claim 19, wherein to provide the current clock time to the virtual device the processing device is further to:

grant the virtual device access to a memory location managed by the hypervisor; and write the current clock time to the memory location.

* * * * *